United States Patent Office 3,838,137
Patented Sept. 24, 1974

3,838,137
BRANCHED ETHYLENE/DIENE COPOLYMER
Walter K. Tang, Wilmington, Del., assignor to E. I. du Pont de Nemours and Company, Wilmington, Del.
No Drawing. Filed Feb. 16, 1968, Ser. No. 705,888
Int. Cl. C08f 1/56, 15/40
U.S. Cl. 260—80.78
10 Claims

ABSTRACT OF THE DISCLOSURE

An ethylene/diene copolymer having a Branching Factor of at least 1.1 is prepared by copolymerizing ethylene in a hydrocarbon solvent with a non-conjugated diene having a polymerization reactivity substantially lower than that of ethylene, in the presence of a regenerative coordination catalyst system comprising essentially a vanadium compound, an organoaluminum compound and a halogen-containing oxidant, at a 25–80% conversion of diene and a catalyst efficiency of at least twice that of the same polymerization mixture without an oxidant.

BACKGROUND OF THE INVENTION

This invention relates to sulfur-vulcanizable, chain-saturated elastomeric ethylene/diene copolymers and, more particularly, to a process for preparing such copolymers.

Sulfur-curable ethylene/diene copolymers, especially copolymers of ethylene, propylene and non-conjugated hydrocarbon dienes have great commercial interest because of their superior properties such as resistance to ozone degradation.

It is also known to copolymerize ethylene with alpha-olefins and non-conjugated dienes using vanadium compound/organoaluminum compound coordination catalysts and it is further known to enhance the efficiency of such polymerization systems by the addition of halogen-containing oxidants such as hexachloropropene or benzotrichloride.

When the non-conjugated hydrocarbon diene in such polymers has a polymerization reactivity substantially lower than ethylene and the double bonds therein exhibit unequal polymerization activity (e.g., 1,4-hexadiene, which is only about one-tenth as active as ethylene) and the polymerization is conducted in a halogenated solvent, the copolymers produced tend to be relatively free from branching and are thought to possess few, if any, side chains derived from more than one monomer unit. For many applications, it is desirable that ethylene/diene copolymers possess a significant amount of branching to improve processing characteristics, increase the green strength of uncured stocks, and reduce the viscosity of solutions of a polymer of a given bulk viscosity in the solvents employed in their manufacture and use. It is known that a controlled amount of branching can be introduced into ethylene copolymers by the incorporation of a small proportion of units derived from a $C_5$–$C_{22}$ diolefin having two readily polymerizable double bonds such as 1,7-octadiene. This procedure, however, requires the addition of yet another monomer to the polymerization recipe and further complicates the manufacturing process. There has been a need for a simple efficient procedure whereby branching of ethylene/diene copolymer can be effected and controlled without the use of additional monomers.

SUMMARY OF THE INVENTION

According to this invention an ethylene/diene copolymer having a Branching Factor of at least 1.1 is prepared in a continuous process by polymerizing in a hydrocarbon solvent ethylene and a nonconjugated hydrocarbon diene having only one terminal double bond and having a polymerization reactivity substantially lower than that of ethylene in the presence of a coordination catalyst comprising a vanadium compound, an organoaluminum compound and a halogen-containing oxidant, at a conversion of diene of 25–80%, sufficient oxidant being present to provide a catalyst efficiency of at least twice that of the same polymerization system without an oxidant.

DESCRIPTION OF THE INVENTION

The term "Branching" and "Branched Polymer," as used herein, refers to polymers having side chains comprising essentially a combination of more than one monomer unit and having a chain length sufficient to provide the polymer with a Branching Factor of at least 1.1.

The term "comprising essentially" means that all of the recited components must be present and other components, which do not seriously detract from the functioning of the recited components or the properties of the product can also be present.

"Catalyst efficiency" refers to the grams of polymer produced per gram-atom of vanadium used in making the polymer.

An indication of polymer branching is the relationship between the polymer's Wallace Plasticity and its inherent viscosity. Wallace Plasticity is determined on a Wallace Plastimeter (manufactured by H. W. Wallace & Company, London); a pellet of polymer 0.125–0.300 inch in thickness is compressed for ten seconds to 1.00 mm. in thickness and heated to 100° C.; then the pellet is subjected to a 10 kg. load for 15 seconds at 100° C. and the final thickness, expressed as a multiple of 0.01 mm. units of thickness, is the Wallace Plasticity. Inherent viscosity, ($\eta_{inh}$) is measured at 30° C. on a solution of 0.1 gram of polymer in 100 ml. of tetrachloroethylene.

The Branching Factor (BF) of a polymer, for purposes of this invention, is defined as follows:

$$BF = \frac{WP + 26}{27.7\,(\eta_{inh} - 0.2)}$$

where WP is Wallace Plasticity.

The copolymers of this invention are made in any hydrocarbon which is a solvent for the catalyst components and monomers after they are mixed. Halogenated solvents such as tetrachloroethylene, for reasons not known, are not suitable as solvent media for preparing the branched polymers according to the process of this invention. Acyclic solvents which can be used include pentane, hexane, heptane and other aliphatic liquids. Cycloaliphatic solvents such as cyclohexane, methyl cyclohexane, etc. can also be used. The art is well aware of hydrocarbon solvents useful in the free-radical polymerization of ethylene to high molecular weight polymers, and generally these can be empoyed.

Any of the oxidants known to the art for increasing the efficiency of vanadium/organoaluminum coordination catalysts are useful herein and are used in sufficient amount to provide a catalyst efficiency at least two times the efficiency of the same catalyst system without the oxidant. U.S. 3,301,834 to Christman discloses useful proportions of catalyst components which can be used. Preferred oxidants are benzotrichloride and hexachloropropene. Other oxidants which are useful herein include carbon tetrabromide, 2 - bromo-2-methylpropionyl bromide, N - bromopyridinium tribromide, bromoacetyl bromide, chloroacetyl chloride, trichloroacetyl chloride, trichloroacetic anhydride, 2,2,2-trichloro-N-phenylacetamide, 2,2,2-trichloro-N,N-diphenylacetamide,

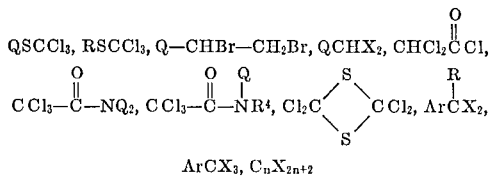

where $n$ is greater than one, R is hydrogen, alkyl, haloalkyl, aryl, haloaryl or alkaryl; Q is aryl such as phenyl, naphthyl, etc.; $R^4$ is alkyl, Ar is aryl other than phenyl (such as naphthyl), haloaryl, X is halogen such as Cl, Br or I. Specific examples of oxidants described generically above include

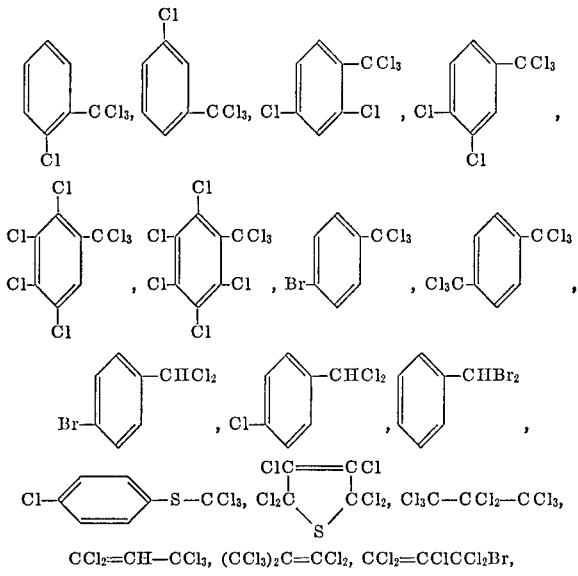

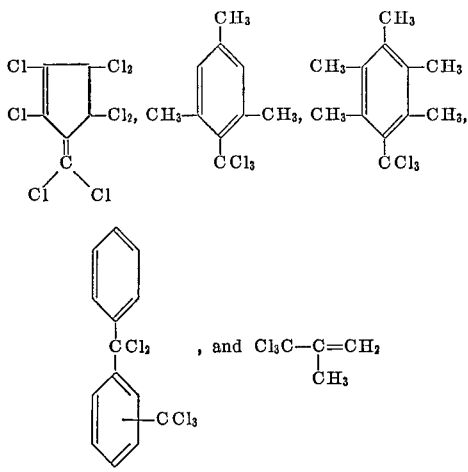

Controlling the branching of otherwise substantially linear polymers produced according to this invention is attained by conducting the polymerizations at diene conversions ranging from 25 to 80 percent. Diene conversion (percent DC) is defined by the following equation:

$$\text{Percent DC} = \frac{\text{DuP} \times 100}{\text{DuP} + \text{DS}}$$

where DuP is gram moles diene units in polymer produced, DS is gram moles diene in solution leaving reactor, and each is for the same period of time.

For each catalyst combination plus oxidant there will be some threshold conversion where branching becomes significant. For example, systems using $VOCl_3$, diethylaluminum chloride and triethylaluminum with benzotrichloride appear to induce substantial branching in that they produce copolymers having Branching Factors of at least 1.1, at about 25 percent diene conversion whereas systems using $VOCl_3$, diisobutylaluminum chloride and hexachloropropene may require a diene conversion of at least about 30 percent before substantial branching occurs. The proper conversion in each case will be dictated by the degree of branching desired which in turn will be governed by the properties desired in the polymer product. The art is well aware of the effect of branching on polymer properties and can readily determine the amount of branching desired in any given case.

The amount of conversion of diene to polymer in the polymerization reaction can be controlled by adjusting one or more of the factors known to the art. Increased conversions are achieved by increasing the amount of catalyst or using a longer reaction period or lowering the monomer concentrations or combinations of these. Changing the temperature of the reaction mixture also affects the conversion as does the choice of oxidant. With an acyclic diene there appears to be little or no branching at diene conversions below 25%.

The efficiency of the catalyst systems utilized in this invention can usually be increased substantially by adding to the polymerization mixture an activator compound, that is, a hydrocarbon soluble compound selected from the group (1) isoprenylaluminum, (2) certain organic Lewis bases such as ethers, esters, ketones and organic amines of less than about 19 carbon atoms, (3) trialkylaluminum compounds of less than about 31 carbon atoms and (4) compounds having the formula

where —A is acetylacetonate,

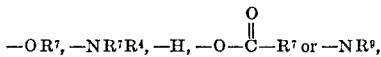

and each of $R^5$, $R^6$ and $R^7$ is alkyl, preferably $C_1$-$C_6$, and $R^9$ is alkylene, preferably $C_4$-$C_5$.

Preferred activators are trialkylaluminum compounds and compounds of the general formula

as defined above. The compounds triethylaluminum, triisobutylaluminum, isoprenylaluminum, tridecylaluminum, $(C_2H_5)_2AlOC_2H_5$ and $(C_2H_5)_2AlO(i-C_3H_7)$ are particularly preferred for excellent performance, ready availability and excellent handling characteristics. Other representative activators include: $Ti[OCH(CH_3)_2]_4$, $Al[OCH(CH_3)_2]_3$, $(C_4H_9)_2Al—N(C_2H_5)_2$, $CH_3COOC_2H_5$, $(C_2H_5)_3N$, pyridine, $(_2H_5)_2O$, diethylaluminum acetylacetonate, amines such as alkyl and aryl amines each of which can be primary, secondary or tertiary. Representative amines are aniline, dimethylaniline, ethylamine, propylamine, butylamine and trihexyl amines. Dimethyl ether, diethyl ether and tetrahydrofuran are useful ethers. Among the useful ketones are acetone, methyl ethyl ketone, methyl isobutyl ketone, cyclopentanone and cyclohexanone. Preferred esters include methyl, ethyl, propyl, butyl and phenyl acetates. When the organoaluminum component of the catalyst system is a trialkylaluminum compound the activator must not be that same trialkylaluminum compound and when the activator is an alkylaluminum compound the organoaluminum component of the catalyst must not be the same alkylaluminum compound.

In any given instance a Lewis base can be tested to determine its operability as an activator for use in the present invention by admixing one molar part of the candidate with two molar parts benzotrichloride with a one-tenth molar solution of diisobutylaluminum chloride containing five molar parts of the latter compound. The test solvent is preferably the solvent to be used in the polymerization. If the mixture does not turn brown within thirty minutes the compound is suitable as the activator component in the catalyst solution of this invention.

The activator is used in the catalyst in the amount of about 0.1–150 molar parts based on vanadium in the catalyst and preferably in the amount of 1 to 50 parts per part of vanadium present. Less than this is ineffective for producing significantly improved vanadium efficiencies and more than this tends to reduce efficiencies and adds to the cost of the catalyst.

The improvement of this invention is obtained in copolymerizing ethylene with at least one non-conjugated hydrocarbon diene having a polymerization reactivity substantially lower than ethylene, generally, less than one-half that of ethylene. Preferably, the polymerization also involves the incorporation of units of an alpha-monoolefin of from about 3 to 10 carbon atoms, e.g., propylene.

Representative dienes include (1) open-chain, non-conjugated hydrocarbon dienes having only one terminal double bond and having from 6 to 22 carbon atoms, e.g., 1,4-hexadiene and (2) vinyl monocyclic alkenes having from 5 to 10 ring carbon atoms, e.g., vinyl cyclohexene.

Other representative useful monomers of the type mentioned and the general procedures for polymerization are contained in U.S. 2,933,480 to Gresham et al., U.S. 3,260,708 to Natta and U.S. 3,301,834 to Christman.

In a particularly preferred embodiment, this invention is employed in a continuous process for the preparation of polymers containing about 55.6 to 84.1 mol. percent ethylene units, 0.8 to 3.1 mol. percent diene units, and the remainder propylene units.

Preferred vanadium components of the catalyst used in this invention are the compounds vanadium oxytrichloride (VOCl$_3$), vanadium tetrachloride (VCl$_4$) and vanadium tris-(acetylacetonate) (VAA).

Other useful vanadium compounds include addition complexes of these vanadium halides with oxygen- or nitrogen-containing ligands, i.e., compounds like VOCl$_3$-tetrahydrofuran or vanadium tetrachloride-bispyridine can be used. It is also possible to use chelate complexes of vanadium with 1,3-dioxo compounds of the general formula

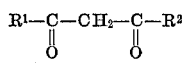

(where R$^1$ and R$^2$ are unsubstituted and/or substituted alkyl residues with 1–4 C-atoms, or phenyl), e.g., with compounds such as acetylacetone, benzylacetone, or acetoacetic ester. These chelate complexes can be derived from 3-, 4-, or 5-valent vanadium and in the complex not only the 1,3-dioxo component alone can be bound to the vanadium, but also halogen and/or oxygen atoms. Examples thereof are: diacetylacetone vanadium-IV-oxide, acetoacetic ester-vanadium-V-oxydichloride and tribenzoylacetone vanadium-III. Finally, suitable catalyst components are also vanadium halides soluble in organic solvents, in which the halogen atoms in particular of VCl$_4$ or of VOCl$_3$, are substituted completely or partially by alkoxy- or aryloxy groups such as, e.g., the butyl ester of o-vanadic acid or ethoxyvanadium-V-oxydichloride.

The organoaluminum component of the catalyst includes trialkylaluminum compounds, dialkylaluminum halides, alkylaluminum dihalides and mixtures thereof. The chlorides are preferred but the bromides and iodides can be used; fluorides can be used in admixture with other halides. Preferred are the compounds wherein alkyl is acyclic alkyl of from 1 to 8 carbon atoms. Triarylaluminum compounds such as triphenylaluminum can be used. Particularly preferred are diisobutylaluminum chloride (DIBAC) or diethylaluminum chloride (DEAC) and its mixtures with triethylaluminum (TEAL) or diethylaluminum ethoxide.

In this catalyst system, the ratio of aluminum atoms to vanadium atoms (Al/V ratio) is from about 3/1 to about 200/1; preferably, the Al/V ratio is between about 20/1 to 80/1. The ratio of moles of oxidant to atoms of vanadium (Ox/V ratio) is from about 1/1 to about 200/1; preferably, the Ox/V ratio is between about 20/1 to 80/1. The vanadium component is present in an amount of about 0.001 to 1 millimole per liter of diluent present.

The present invention is an improvement in the polymerization of known monomers by the use of known catalyst systems components. In relation to such known aspects, the prior art is very informative and is intended to supplement the instant disclosure as to general conduct of the polymerization, use of solvents or diluents, catalyst component and oxidants, handling of monomers, processing of solutions, isolation and methods of use for the polymer, etc.

The following examples illustrate the invention. All parts and percentages are by weight unless otherwise specified.

THE EXAMPLES

The examples which follow illustrate the continuous preparation of an elastomeric ethylene/propylene/1,4-hexadiene tripolymer in solution in hexane at high conversion of diene at superatmospheric pressure.

The operating details are given in Table I below. In each case, the copolymerization is carried out in a stainless steel, one-liter reactor operated liquid-full at a pressure of about 400 pounds per square inch (gauge). Compressed ethylene, propylene and a 10 volume percent solution of 1,4-hexadiene, containing about 93 to 97 percent *trans*-isomer, are mixed before being introduced into the reactor. Separate hexane solutions of the various catalyst components are fed to the reactor, the coordination catalyst itself being formed *in situ*.

The reactor effluent is joined by a stream supplying 100 milliliters per hour of a solution containing an antioxidant for the polymer and a catalyst deactivator. This solution is prepared by dissolving ten grams of 4,4'-thiobis(6-tert-butyl-3-methyl phenol) ["Santowhite crystals," Monsanto Chemical Company] in a mixture containing 1 liter of isopropyl alcohol and 3 liters of hexane. The reactor effluent then flows to a monomer flasher operated at about 60° C. and 10 pounds per square inch (gauge) pressure where the unreacted propylene monomer is partially removed. The residual polymer solution is extracted over a 30-minute period with about 10% hydrochloric acid and then given a two-stage water wash. Finally, the tripolymer is isolated from hexane and unreacted 1,4-hexadiene monomer on a steam-heated drum drier (about 160° C.). The isolated samples obtained from each individual run are homogeneously blended on a rubber roll mill for about one minute at about 80 to 100° C. before being tested and analyzed.

In Examples 1 through 4, the catalyst solutions employed are as follows: 0.0009 molar vanadium oxytrichloride; 0.014 molar diethylaluminum monochloride; 0.029 molar triethylaluminum; and 0.040 molar benzotrichloride (i.e., α,α,α-trichlorotoluene).

Example 2 illustrates the lowest conversion in any of the examples and the experimental conditions, compared to those of Example 1, are marked by a much shorter residence time, much increased monomer concentrations, and a somewhat lower temperature. Example 3 illustrates a preferred high conversion process and is done in very much the same manner as Example 1 except for slightly lower monomer concentrations. Example 4 illustrates the highest conversion (53.86) of any of the examples and the highest Branching Factor (1.34). The procedure is very much like that of Example 3.

Examples 5 through 8 employ the same vanadium component used in Examples 1 through 4, but the organoaluminum component and the oxidant are changed. A 0.080 molar solution of hexachloropropylene in hexane is substituted for the benzotrichloride solution. A 0.0584 molar solution of diisobutylaluminum monochloride in hexane is used in place of the hexane solutions of diethylaluminum chloride and triethylaluminum.

Example 5 illustrates the highest proportion of oxidant to vanadium (50:1).

Example 6, a low conversion process, indicates the lowest Branching Factor product (1.11). A short residence time (19.64 minutes) is combined with high monomer concentrations.

Example 7 illustrates the lowest monomer concentration used in any of the examples. Example 8 shows a very high conversion process (51.84%) and a correspondingly high Branching Factor (1.33). The procedure is very similar to that used in Example 7; in Example 8, the propylene monomer concentration at steady state in the reactor is the lowest used in any of the examples.

TABLE I

| Example | 1 | 2 | 3 | 4 | 5 | 6 | 7 | 8 |
|---|---|---|---|---|---|---|---|---|
| Temperature (° C.) | 36 | 30 | 35 | 25 | 30 | 33 | 30 | 30 |
| Vanadium conc. (millimoles/liter) | 0.044 | 0.045 | 0.045 | 0.045 | 0.045 | 0.044 | 0.045 | 0.045 |
| Al/V ratio | 30.6/1 | 22.4/1 | 30.6/1 | 30.6/1 | 50/1 | 51/1 | 50/1 | 50/1 |
| Ox/V ratio | 25.8/1 | 22.2/1 | 25.8/1 | 25.8/1 | 50/1 | 25/1 | 40/1 | 40/1 |
| Residence time (min.) | 28.45 | 19.39 | 28.85 | 28.90 | 30.30 | 19.64 | 30.57 | 30.52 |
| Propylene feed (lbs./hr.) | 0.230 | 0.355 | 0.226 | 0.230 | 0.250 | 0.530 | 0.190 | 0.190 |
| Ethylene feed (lbs./hr.) | 0.1882 | 0.277 | 0.1882 | 0.1882 | 0.1740 | 0.2757 | 0.1480 | 0.1480 |
| Hexadiene feed (lbs./hr.) | 0.0203 | 0.0555 | 0.0177 | 0.0186 | 0.0210 | 0.0430 | 0.0160 | 0.0160 |
| Propylene conversion (percent) | 49.22 | 39.85 | 54.10 | 59.84 | 46.87 | 30.13 | 55.02 | 57.01 |
| Hexadiene conversion (percent) | 39.97 | 31.11 | 47.31 | 53.86 | 45.79 | 32.44 | 50.03 | 51.84 |
| Polymer (grams/hr.) | 136.5 | 191 | 140.8 | 149 | 139.6 | 199.0 | 116.0 | 114.0 |
| Polymer characteristics: | | | | | | | | |
| Percent propylene units | 37.6 | 33.6 | 39.4 | 41.9 | 38.1 | 36.4 | 40.9 | 43.1 |
| Percent hexadiene units | 2.70 | 4.10 | 2.70 | 3.05 | 3.13 | 3.18 | 3.13 | 3.30 |
| Wallace Plasticity | 42 | 43.5 | 49 | 56 | 54 | 45 | 33 | 32.5 |
| Inherent viscosity* | 2.17 | 2.27 | 2.28 | 2.4 | 2.58 | 2.49 | 1.89 | 1.78 |
| Branching factor | 1.24 | 1.22 | 1.30 | 1.34 | 1.21 | 1.11 | 1.26 | 1.33 |

*Measured at 30° C. on a solution of 0.1 gram of copolymer in 100 ml. of tetrachloroethylene.

NOTE.—In Examples 1–4 the mole ratio triethylaluminum:diethylaluminum chloride is 2:1.

In addition to the improvement in processing characteristics and green strength, it is found that ethylene terpolymers with increased branching facilitate obtaining an ozone-resistant blend with natural rubber. The branched copolymer of this invention is blended with natural rubber by conventional blending techniques well known and described in the art. The blend can be conventionally compounded and cured. Vulcanizates of such compounded blends containing, for example, about 20 weight percent of the branched copolymer, exhibit superior ozone resistance, especially when compared to identical blends wherein the same copolymer is much less branched. Ethylene copolymers with 34 percent propylene and 4.1 percent 1,4-hexadiene made according to this invention and having a Branching Factor of about 1.22, a 46 Wallace Plasticity and 64 Mooney viscosity (ML–4/250° F.) are quite suitable for this purpose.

What is claimed is:

1. In the continuous process for preparing an ethylene/diene copolymer having a Branching Factor of at least 1.1 by polymerizing ethylene in the presence of a regenerative coordination catalyst system comprising a vanadium compound, an organoaluminum compound and a halogen-containing oxidant with a non-conjugated hydrocarbon diene of the group
   (1) acyclic dienes having only one terminal double bond and 6–22 carbon atoms, and
   (2) vinyl monocyclic alkenes having 5–10 ring carbon atoms,
said diene having a polymerization reactivity substantially lower than that of ethylene, the improvement comprising essentially conducting the polymerization in an aliphatic hydrocarbon solvent at a diene conversion of 25–80% and a catalyst efficiency of at least twice that of the same polymerization reaction mixture without an oxidant, said vanadium compound being soluble in said solvent, and wherein the ratio of aluminum atoms to vanadium atoms is from about 3/1 to about 200/1, and the ratio of moles of oxidant to atoms of vanadium is from about 1/1 to about 200/1.

2. The process of claim 1 in which ethylene is copolymerized with a non-conjugated acyclic diene.

3. The process of claim 1 in which ethylene is copolymerized with propylene and 1,4-hexadiene, the vanadium compound is $VOCl_3$, $VCl_4$ or vanadium tris(acetylacetonate) and the organoaluminum compound is (1) an aluminum trialkyl, (2) a dialkyl aluminum halide, or a mixture of (1) and (2), the alkyl containing 1–8 carbon atoms and the halide being chloride or bromide.

4. The process of claim 3 in which the oxidant is hexachloropropene, a bis(trichloromethyl) benzene, a chloro benzotrichloride or benzotrichloride.

5. The process of claim 1 in which the catalyst comprises essentially vanadium oxytrichloride and diisobutyl aluminum chloride, the oxidant is hexachloropropene and the diene conversion is 30–80%.

6. The process of claim 1 in which the catalyst comprises essentially vanadium oxytrichloride and diethyl aluminum chloride, benzotrichloride and an activator.

7. The process of claim 6 in which the activator is diethylaluminum ethoxide.

8. The process of claim 3 in which the catalyst comprises essentially vanadium oxytrichloride, diisobutyl aluminum chloride and hexachloropropene and the diene conversion is 30–80%.

9. The process of claim 3 in which the catalyst comprises essentially vanadium oxytrichloride, diethyl aluminum chloride, benzotrichloride and an activator compound.

10. The process of claim 3 in which the ratio of aluminum atoms to vanadium atoms is between about 20/1 to 80/1, and the ratio of moles of oxidant to atoms of vanadium is between about 20/1 to 80/1.

References Cited

UNITED STATES PATENTS 3,723,348 3/1973 Apotheker et al. ___ 260—80.78
3,481,911 12/1969 Kahle _____ 260—80.78

FOREIGN PATENTS 925,468 5/1963 Great Britain.

OTHER REFERENCES

German R. and Vaughan G.: *Ethylene Propylene Terpolymers*, Rubber Chemistry and Technology, vol. 40, March 1967, pp. 570–575.

*Polythene*, ed. by A. Renfrew and P. Morgan (1960), Interscience Publishers, New York, pp. 349–351.

JOSEPH L. SCHOFER, Primary Examiner

E. J. SMITH, Assistant Examiner

U.S. Cl. X.R.

260—88.2 E